United States Patent [19]

Bautista et al.

[11] Patent Number: 4,895,813

[45] Date of Patent: Jan. 23, 1990

[54] METHOD FOR FABRICATING DEVICES INCLUDING MULTICOMPONENT METAL HALIDE GLASSES AND THE RESULTING DEVICES

[75] Inventors: Jerry R. Bautista, Basking Ridge; Matthijs M. Broer, Lebanon; Allan J. Bruce; James W. Fleming, both of Westfield; Kenneth L. Walker, New Providence, all of N.J.

[73] Assignee: American Telephone and Telegraph Company, AT&T Bell Laboratories, Murray Hill, N.J.

[21] Appl. No.: 103,229

[22] Filed: Sep. 30, 1987

[51] Int. Cl.$^4$ .............................................. C03C 13/04
[52] U.S. Cl. .......................................... 501/37; 65/2; 65/3.11; 65/83; 65/84; 65/DIG. 16
[58] Field of Search ................ 501/30, 37; 65/2, 3.11, 65/83–85, DIG. 16

[56] References Cited

U.S. PATENT DOCUMENTS

| | | | |
|---|---|---|---|
| 4,308,066 | 12/1981 | Mitachi et al. | 501/37 |
| 4,346,176 | 8/1982 | Kanamori et al. | 501/37 |
| 4,378,987 | 4/1983 | Miller et al. | 501/37 |
| 4,380,588 | 4/1983 | Mitachi et al. | 501/37 |
| 4,674,835 | 6/1987 | Mimura et al. | 350/96.34 |
| 4,699,464 | 10/1987 | Cohen et al. | 501/37 |
| 4,704,371 | 11/1987 | Krolla et al. | 501/40 |
| 4,711,652 | 12/1987 | Roba et al. | 501/40 |
| 4,741,752 | 5/1988 | France et al. | 501/37 |

FOREIGN PATENT DOCUMENTS 60-36346 2/1985 Japan.

*Primary Examiner*—Olik Chaudhuri
*Assistant Examiner*—Andrew Griffis
*Attorney, Agent, or Firm*—Bernard Tiegerman

[57] ABSTRACT

A new method for fabricating devices which include multicomponent metal halide glasses, e.g., multicomponent metal halide glass optical fibers, is disclosed. In accordance with the inventive method, a multicomponent metal halide glass body, essentially free of crystallites, is produced by cooling essentially every portion of a melt incorporated into the glass body at a quench rate which is necessarily greater than or equal to about 10 Kelvins per second (K/sec). This necessary quench rate is achieved by successively quenching relatively small portions of the melt, e.g., thin layers or droplets of melt material, having relatively small cross-sectional dimensions.

7 Claims, 2 Drawing Sheets

METHOD FOR FABRICATING DEVICES INCLUDING MULTICOMPONENT METAL HALIDE GLASSES AND THE RESULTING DEVICES

BACKGROUND OF THE INVENTION

1. Field of the Invention

The invention pertains to methods for fabricating devices which include multicomponent metal halide glasses, e.g., multicomponent metal halide glass optical fibers, as well as the resulting devices.

2. Art Background

Multicomponent metal halide glasses are glasses having compositions which include two or more metal halides (metal fluorides, metal chlorides, metal bromides or metal iodides). These glasses are of commercial/technological interest because, it is believed, they are potentially useful in devices employed for transmitting electromagnetic radiation, e.g., optical fiber. That is, one measure of the utility of any glass as an optical transmission medium is the total optical power loss produced by the glass. This loss is the sum of the extrinsic optical power losses (optical power losses due to impurities, compositional variations and defects) and intrinsic optical power losses (losses inherent to the glass, and due to factors other than impurities, compositional variations and defects) associated with the glass. In this regard, it is believed that multicomponent metal halide glasses exhibit minima in their intrinsic losses, at wavelengths between about 2 micrometers ($\mu$m) and 10 $\mu$m, which are far lower than the minimum loss exhibited by, for example, purified silica glass, currently employed in the manufacture of commercial optical fiber.

Presently available techniques for fabricating multicomponent metal halide glasses typically involve heating a mixture of two or more metal halides (usually in powder form) to a temperature equal to or greater than the melting temperature of the mixture, $T_m$. The resulting melt is then cooled to a temperature which is equal to or less than the corresponding glass transition temperature, $T_g$, to form a solid glass body.

As is known, cooling a melt from $T_m$ to $T_g$ necessitates passage through an intermediate temperature range where crystallites (particles found in a glass, produced by devitrification, and readily visible with an optical microscope) tend to form. Such crystallites are undesirable because they are responsible for, or increase, the extrinsic optical scattering associated with the resulting glass, and thus lead to increased optical power loss. Stated, alternatively, a measure of the total optical power loss produced by a glass is the ratio of the output optical power, Po, to the input optical power, Pi, which is given by the relation $$P_o/P_i = 10^{-\alpha L/10}. \qquad (1)$$

In Eq. (1), $\alpha$ denotes the optical loss coefficient of the glass in decibels per unit length, e.g., per kilometer, of the glass (dB/km), and L is the length of the glass traversed by the incident electromagnetic radiation in corresponding length units. Both optical absorption and optical scattering contribute to $\alpha$. Significantly, the portion of $\alpha$ due to scattering alone, $\alpha_s$, is readily measured as a function of the vacuum wavelength, $\lambda$, of the incident electromagnetic radiation, using conventional techniques. (Regarding these techniques see, e.g., *Optical Fibre Communications*, edited by the technical staff of CSELT (McGraw-Hill, N.Y., 1981), Chapter 3.) As is known, each such measured value of $\alpha_s$ consists of two components. The first component is due to intrinsic optical scattering (optical scattering inherent to the glass) and (because the contributions due to Raman and Brillioun scattering are negligible), when plotted as a function of $\lambda$, is well approximated by (the so-called Rayleigh form) $B/\lambda^4$. Here, B is a material parameter, independent of $\lambda$, whose value is readily inferred from measurements of $\alpha_s$ at different wavelengths. (The intrinsic scattering is largely due to static density variations in the glass having dimensions which are small compared to the (vacuum) wavelength of the incident electromagnetic radiation.) The second component of $\alpha_s$ is due to extrinsic scattering (scattering which is not inherent to the glass), produced by density fluctuations in the glass having dimensions which are comparable to, or larger than, the (vacuum) wavelength of the incident radiation. For purposes of this disclosure, the second component is that portion of $\alpha_s$ which exceeds $B/\lambda^4$. Typically, this excess is well approximated by the function $C/\lambda^2 + D$ where, as before, the values of C and D are readily inferred from measured values of $\alpha_s$ at different wavelengths. It is this second component of $\alpha_s$ which is due to, or increaed by, the presence of the crystallites.

Until recently, it was believed tht crystallites are avoided in any multicomponent halide glass provided the corresponding melt is quenched (cooled), through the temperature range where such crystallites tend to form, at a rate which is equal to or greater than a corresponding critical quench (cooling) rate, $R_C$, whose value is determined using conventional differential scanning calorimetric (DSC) techniques. (Regarding these DSC techniques for determining $R_C$ see, e.g., T. Kanamori and S. Takahashi, Japanese Journal of Applied Physics, Vol. 24, p. L758(1985); and A. J. Bruce in Material Science Forum, Vol. 5 (Trans Tech Publication, Switzerland, 1985), p. 193.) Based upon this belief, at least three different techniques were developed for fabricating multicomponent metal halide glass optical fibers, capable of achieving quench rates equalt o or greater than the corresponding value of $R_C$. In the first of these techniques, called built-in casting, a first melt is poured into a cylindrical mold, the central portion of the mold is poured out, and then a second melt is poured into the center of the mold. To achieve commercially significant lengths of fiber, the inner diameter of the mold is preferably 1 centimeter (cm) or larger. Upon cooling the two, concentric melts, the resulting solid glass (cylindrical) body (which necessarily has an outer diameter equal to or greater than 1 cm) constitutes an optical fiber preform, which is transformed into an optical fiber using conventional drawing techniques. (Regarding built-in casting see, e.g., S. Mitachi and T. Miyashita, Elec. Lett., Vol. 18, p. 170(1982).) Significantly, when using a mold having an inner diameter equal to or larger than 1 cm, and when forming a multicomponent metal fluoride glass, the built-in casting technique is capable of achieving a quench rate as high as about 10 Kelvins per second (K/sec), which is typically far higher than $R_C$ for any multicomponent metal halide glass.

In the second technique, called rotational casting, a first melt is poured into a vertically oriented, cylindrical mold which, after being horizontally oriented, is rotated about its longitudinal axis to force the melt (under the influence of the resulting centrifugal force) from the center of the mold to the inner surface of the mold. The mold is then vertically oriented, and a second melt is poured into the center of the mold. Again, conventional drawing techniques are used to convert the resulting cylindrical glass preform into an optical fiber. (Regarding rotational casting see, e.g., D. C. Tran et al, Elec. Lett., Vol. 18, p. 657(1982).)

In the third technique, called the double crucible technique, a first melt is poured into a first crucible, and a second melt is poured into a second crucible which encircles the first crucible, with the bottoms of the two crucibles converging to a common point. An optical fiber is drawn directly from this common point using conventional techniques. (Regarding the double crucible technique see, e.g., H. Tokiwa et al, Elec. Lett., Vol. 21, p. 1131(1985).)

Unfortunately, and despite the fact that the cooling rates always exceed the corresponding $R_{CS}$, the above-described optical fiber fabrication techniques always yield optical fiber preforms, and thus optical fibers, which exhibit relatively large numbers of crystallites, readily seen with an optical microscope. As a consequence, at the minimum loss wavelengths for these optical fibers, as determined via the conventional cut-back technique, the portion of $\alpha_s$ due to extrinsic scattering always exceeds 0.1dB/km. (Regarding the cutback technique see, e.g., D. Marcuse, *Principles of Optical Fiber Measurements* (Academic Press, N.Y., 1981), chapter 5.)

Because the above-described belief concerning critical cooling rates has proven to be meaningless, those artisans engaged in the fabrication of devices which include multicomponent halide glasses have, to date, been stymied in their efforts to prevent the formation of undesirable crystallites in these devices.

Thus, those engaged in the fabrication of devices which include multicomponent halide glasses have sought, thus far without success, techniques for fabricating such devices which avoid undesirable crystallite formation.

SUMMARY OF THE INVENTION

The invention involves the finding that a multicomponent metal halide glass essentially free of undesirable crystallites is readily fabricated by cooling essentially every portion of the melt incorporated into the glass at a quench rate which is necessarily greater than about 10K/sec, and (generally empirically) chosen to substantially preclude the formation of crystallites. Preferably, this quench rate is greater than or equal to about 30K/sec, and even more preferably greater than or equal to about 70K/sec.

The invention also involves the recognition that the quench rate of a melt is proportional to the ratio of the thermal diffusivity of the melt material to the square of the cross-dimensional dimension, e.g., diameter, of the melt container. Thus, and based upon this recognition, the invention further involves the realization that the relatively high quench rates, discussed above, are readily achieved by successively cooling relatively small portions of a melt, e.g., thin layers or droplets of melt material, with each such portion having a relatively small cross-sectional dimension.

The invention still further involves two techniques for cooling, and combining, relatively small portions of a melt to form a glass body essentially free of crystallites. In the first technique, a substrate is repeatedly dipped into the melt, with each dipping resulting in the successive adherence of a relatively thin layer of melt material to the substrate, and with each such thin layer undergoing quenching upon removal of the substrate from the melt. In the second technique, a melt is flowed through a nozzle to form relatively small melt droplets, which are impinged upon a substrate to form successive thin layers. The melt droplets are quenched during their flight times to the substrate, with the thin layers formed by the coalescence of the droplets then undergoing further cooling.

BRIEF DESCRIPTION OF THE DRAWINGS

The invention is described with reference to the accompanying drawings, wherein.

DETAILED DESCRIPTION

Figure 1:
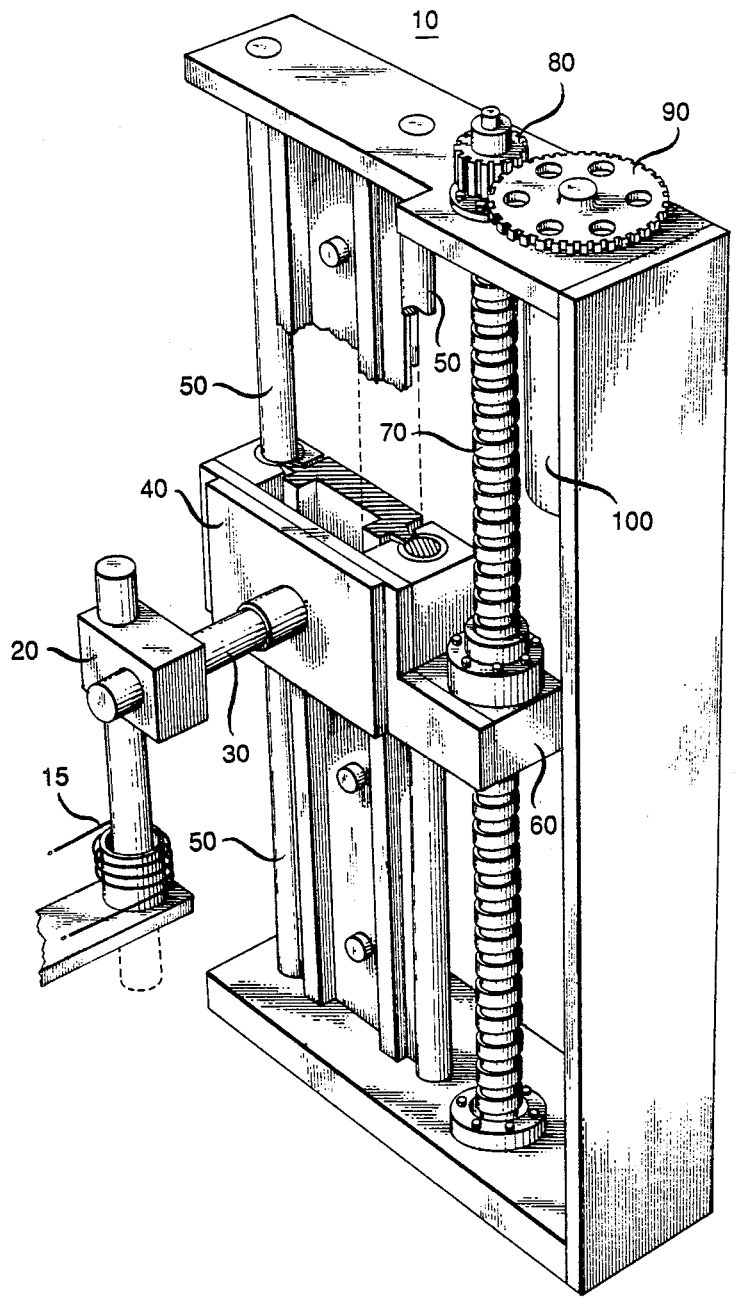
FIGS. 1 and 2 depict apparatus useful in the practice of, respectively, first and second embodiments of the inventive device fabrication method.

The invention is directed to a method for fabricating devices which include multicomponent metal halide glasses, e.g., multicomponent metal halide glass optical fibers, as well as the resulting devices.

As discussed above, the inventive method involves the finding that a multicomponent metal halide glass, essentially free of crystallites, is readily fabricated from a melt by cooling essentially every portion of the melt incorporated into the glass at a quench rate which is necessarily greater than about 10K/sec, and chosen to substantially preclude the formation of crystallites. In general, the useful quench rates are determined empirically by, for example, varying the quench rate and using an optical microscope to detect crystallites in the resulting glass. In this regard, it has been found that the quench rate is preferably greater than or equal to about 30K/sec, and more preferably greater than or equal to about 70K/sec.

As also discussed above, the inventive method also involves the realization that the quench rate of a melt is proportional to the ratio of the thermal diffusivity of the melt material to the square of the cross-sectional dimension, e.g., the diameter, of the melt container, with the proportionality factor being determined by the geometry of the melt, the initial melt temperature and the temperature of the surrounding ambient. (Regarding this proportionality factor see, e.g., R. B. Bird et al, *Transport Phenomena* (Wiley & Sons, N.Y., 1960), p. 357.) In addition, the values of the thermal diffusivities of multicomponent metal halides is widely distributed in the journal literature including, for example, M. G. Drexhage, *Treatise on Material Science and Technology*, Vol. 26, edited by M. Tomozawa et al (Academic Press, N.Y., 1985), chapter 4.) Thus, and based upon this realization, the inventive method further involves the recognition that the relatively high quench rates needed to avoid crystallite formation are readily achieved by successively cooling relatively small portions of the melt, e.g., thin layers or droplets of melt material, having relatively small cross-sectional dimensions.

In a first embodiment of the inventive device fabrication method, a multicomponent metal halide glass, essentially free of crystallites, is formed by repeatedly dipping a glass substrate into a melt having the desired composition. (The glass substrate preferably has the same composition as the multicomponent metal halide glass to be fabricated.) Preferably, the temperature of the melt is greater than the liquidus temperature of the melt composition, to ensure that crystallites are not present in the melt. (Regarding the liquidus temperature see, e.g., A. J. Bruce, *Halide Glasses For Infrared Fibre Optics*, edited by R. M. Almeida (Martinus Nijhoff Publishers, Dordrecht, 1987).) Each withdrawal of the substrate results in the adherence of a relatively thin layer of melt material to the substrate, as well as the quenching of the layer in the surrounding atmosphere. Preferably, the surrounding atmosphere consists of either an inert gas, such as argon or helium, or what is conventionally termed a reactive atmosphere, such as $NF_3$. (Regarding reactive atmospheres see, e.g., M. Robinson, *Halide Glasses For Infrared Fibre Optics*, edited by R. M. Almeida (Martinus Nijhoff Publishers, Dordrecht, 1987). In this configuration, each layer experiences a quench rate inversely proportional to the square of the layer thickness. Consequently, the smaller the layer thickness, the higher the quench rate.

In general, for a given composition, and a given difference in temperature between the melt and the glass substrate, the thickness of an adhered layer is determined by the penetration depth of the substrate into the melt, as well as the residence time of the substrate within the melt. Consequently, in general, the thickness of each adhered layer, and thus the quench rate, needed to avoid the formation of crystallites is empirically determined by varying penetration depth and/or residence time. For example, in the case of a melt having a composition which includes $ZrF_4$, $BaF_2$, $LaF_3$, $AlF_3$ and NaF, it has been found that useful layer thicknesses (those which preclude crystallite formation) are those which are equal to or less than about 1 millimeter (mm), and preferably equal to or less than about 0.3 mm. Moreover, it has been found that such thicknesses are readily produced by employing penetration depths ranging from about 1 mm to about 3 mm and corresponding residence times ranging from about 0.01 sec to about 0.2 sec.

With reference to FIG. 1, an apparatus 10 which has been developed for achieving both controlled penetration of a substrate (hereafter called a bait rod) into a melt, and controlled residence time of the bait rod within the melt, includes a mount 20, which serves to hold the bait rod in, for example, a vertical orientation during the dipping procedure. The mount 20 is connected via a connecting rod 30 to a carriage 40, which slides vertically along two tracks 50. The carriage 40 includes a nut 60 having a threaded aperture through which a vertically-oriented lead screw 70 extends. The apparatus 10 also includes a stepping motor 100 which drives a gear 90 which, in turn, engages a gear 80 encircling one end of the lead screw 70.

In the operation of the apparatus 10, the stepping motor 100 rotates the gear 90, and thus rotates the lead screw 70 through the gear 80. The rotation of the lead screw 70 serves to propel the carriage 40 vertically along the tracks 50, and thus vertically propels the bait rod.

A multicomponent metal halide glass body formed via the inventive first embodiment is useful as, for example, the core rod of an optical fiber preform. The cladding portion of the preform is formed, for example, via the second embodiment of the inventive device fabrication method, described below. This preform is then readily transformed into an optical fiber using conventional drawing techniques.

The glass bodies formed via the inventive first embodiment can have almost any shape, depending upon the shape of the substrate dipped into the melt. Thus, for example, if the substrate is rectangular in shape, then a rectangular sheet of glass is readily produced via the first embodiment.

Figure 2:
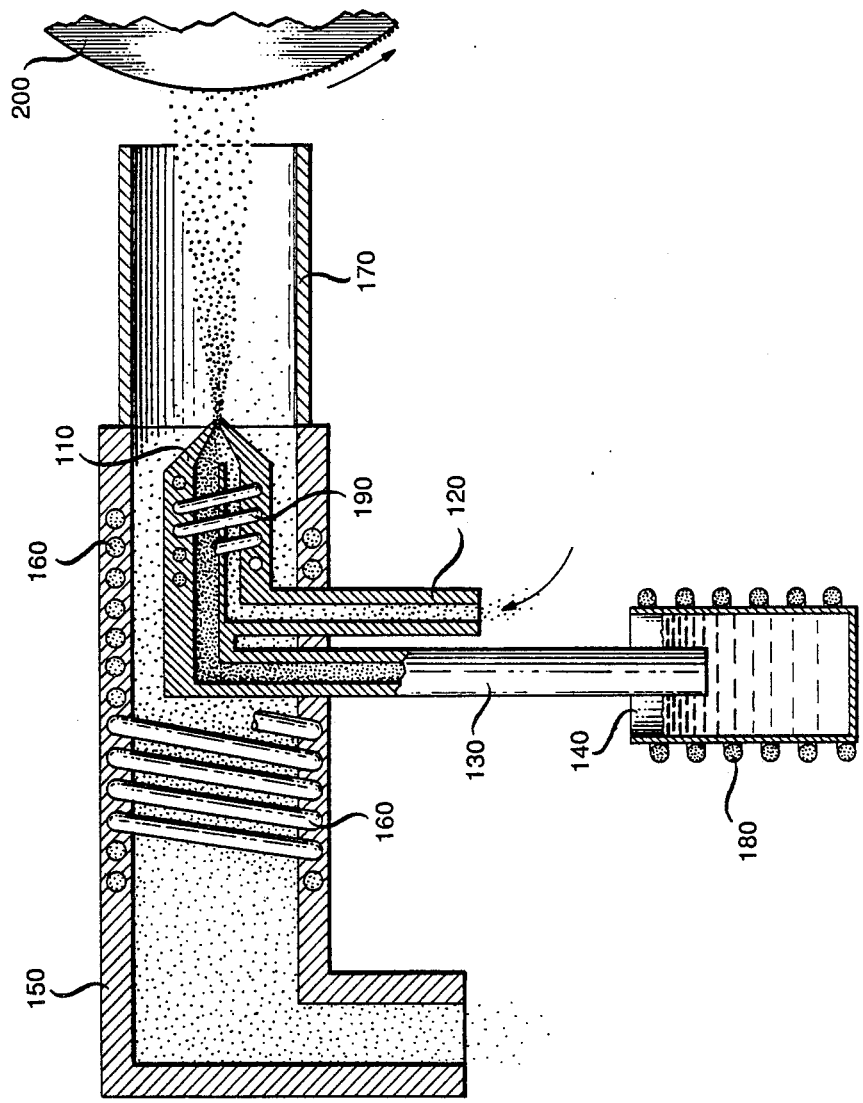

In a second embodiment of the inventive device fabrication method, depicted in FIG. 2, the relatively high quench rates needed to avoid crystallite formation are achieved by flowing a melt (having the desired multicomponent metal halide composition) through a nozzle 110, to form melt droplets having relatively small cross-sectional dimensions, i.e., relatively small diameters. This is achieved by flowing an inert carrier gas, such as He or Ar, into the nozzle 110 via first tube 120. This flow of carrier gas serves to aspirate melt material into the nozzle via a second tube 130, extending into a melt-filled container 140. Preferably, as before, the temperature of the melt in the container 140 is maintained above the liquidus temperature. Useful, commercially available nozzles include nozzle Model SU-1A sold by Spraying Systems Corporation of Wheaton, Ill.

For a given melt composition, and thus given melt viscosity, the diameter of the melt droplets, and thus the quench rate, is largely determined by the size of the nozzle orifice and, to a lesser degree, by the pressure drop across the orifice. That is, increasing the nozzle orifice produces an increase in droplet diameter, and thus a decrease in quench rate. On the other hand, increasing the pressure drop produces a decrease in droplet size, and thus an increase in quench rate.

To produce a glass body, essentially free of crystallites, the quenched melt droplets must be coalesced. This is achieved, in accordance with the second embodiment, by impinging the melt droplets, while still molten, upon a rotating glass substrate 200, where they coalesce into successive, thin melt layers, which undergo further cooling to form the desired glass body.

Significantly, the droplets emanating form the nozzle 110 experience their greatest degree of quenching after traveling less than a centimeter from the nozzle orifice. Moreover, the resulting temperature of the droplets is essentially the same as, or slightly higher than, that of the surrounding atmosphere. If the temperature of this atmosphere were equal to or less than the glass transition temperature of the melt composition, then the melt droplets would be transformed into rigid, tiny glass spheres before impacting the substrate 200. Such glass spheres would necessarily bounce off the substrate, rather than coalescing to form the desired glass body.

To achieve melt droplets which experience the desired rapid quenching through the temperature range where crystallites form, while remaining molten, the nozzle 110 is preferably positioned within a tube 150. This tube serves as a conduit for a flow of gas (hereafter called sheath gas) about the nozzle 110. Useful sheath gases include, for example, inert gases, such as helium or argon, or reactive atmosphere gases. The temperature of the sheath gas is preferably controlled to a value which is below the temperature range where crystallites are formed, but above the glass transition temperature of the melt. This temperature control is achieved, for example, through the use of a heating coil 160 encircling the tube 150 upstream of the nozzle orifice, and through the use of a cooling jacket 170, e.g., a water cooled jacket, encircling the tube 150 downstream of the nozzle orifice. By virtue of the flow of temperature-controlled sheath gas about the nozzle, and thus around the melt droplets, these droplets experience the desired rapid quenching to a temperature which is essentially equal to, or slightly above, that of the sheath gas, and thus the droplets remain molten.

Preferably, to ensure that little or no quenching occurs in the melt container 140 or in the nozzle 110, the temperatures of the container and of the interior of the nozzle are maintained at the liquidus temperature of the multicomponent metal halide composition. This is readily achieved, for example, through the use of heating coils 180 and 190 encircling, respectively, the container 140 and nozzle 110.

The surface of the rotating substrate 200, upon which the melt particles are impinged, is preferably maintained at a temperature near the glass transition temperature of the melt composition. This is achieved, for example, by impinging the surface with a flow of gas, e.g., an inert gas or one of the reactive atmosphere gases, whose temperature is maintained near the glass transition temperature. As a consequence, the molten melt particles coalesce to form thin molten layers on the surface of the substrate 200, which then cool to a temperature near the glass transition temperature.

Preferably, the atmosphere surrounding the tube 150 and substrate 200 consists of either an inert gas, e.g., helium or argon, or one of the reactive atmosphere gases, such as $NF_3$.

By way of example, droplets of melt material, having a composition which includes $ZrF_4$, $BaF_2$, $LaF_3$, $AlF_3$ and $NaF$, and having diameters of about 70 micrometers ($\mu m$), are formed by aspirating a corresponding melt through a nozzle having an exit orifice which is 0.04 cm in diameter. This is achieved by flowing a carrier gas of, for example, He at a flow rate of 3 liters per minute (l/min) through the nozzle, at a pressure of b 530 torr.

Flowing a sheath gas of, for example, He, at a flow rate of 5 l/min, while maintaining the sheath gas temperature at a temperature which is below the temperature range where crystallites form but above the glass transition temperature, e.g., at 300 degrees Centigrade (C), yields the desired droplet quenching while leaving the droplets molten.

Positioning the rotating glass substrate 200 at a distance of, for example, about 6 cm from the nozzle orifice, while impinging the substrate with a flow of, for example, He, maintained near the glass transition temperature, e.g., about 250 degrees C, permits the molten particles to coalesce into thin layers, which then cool to a temperature near the glass transition temperature, to form the desired glass body. A useful flow rate for the He gas is, for example, 3 l/min.

A significant advantage of the second embodiment is that it readily permits variations in the composition of the glass body being formed. That is, these compositional variations are readily produced by, for example, varying the composition of the melt being aspirated through the nozzle. Alternatively, two or more nozzles, serving to aspirate two or more different compositions, are useful for this purpose.

Among other things, the second embodiment is useful for fabricating optical fiber preforms, which are readily drawn into optical fibers using conventional techniques. Alternatively, and by using an appropriately shaped, stationary or nonstationary substrate 200, this embodiment is also useful for fabricating other glass bodies, e.g., glass sheets.

Significantly, both the first and second embodiments yield glass bodies which are essentially free of crystallites. As a consequence, the optical fibers drawn from the optical fiber preforms formed via these techniques exhibit relatively low extrinsic scattering, i.e., the second component of $\alpha_s$, due to extrinsic scattering, is invariably less than or equal to about 0.1 dB/km, and typically less than or equal to about 0.05 dB/km.

EXAMPLE

Approximately 225 grams of cullet (broken pieces of glass), having a composition which includes 53 mole percent $ZrF_4$, 20 mole percent $BaF_2$, 4 mole percent $LaF_3$, 3 mole percent $AlF_3$ and 20 mole percent $NaF$, was placed in a cylindrical platinum crucible. The crucible had a diameter of about 5 cm and a height of about 7 cm. This cullet-containing crucible was inserted into a room-temperature ambient which consisted essentially of $N_2$ and was essentially free of $H_2O$ and $O_2$. The crucible, and thus the cullet, was then heated to a temperature of about 650 degrees Centigrade (C) by rf inductive heating of the crucible, to form a melt having a volume of about 50 cubic centimeters.

The ambient containing the melt-filled crucible also contained the apparatus 10, depicted in FIG. 1. To form a cylindrical glass body having the above composition, a cylindrical bait rod of identical composition, having a diameter of about 0.3 cm and a length of about 15 cm, was placed within the mount 20 of the apparatus 10, the crucible was positioned below the bait rod, and the apparatus 10 was employed to repeatedly dip the bait rod, vertically, into the melt.

The apparatus 10 was augmented by an electric heating coil, positioned to encircle the tip of the bait rod each time the bait rod was withdrawn from the melt. This heating coil served to relieve stress in the bait rod tip by annealing the tip, i.e., by maintaining the tip at a temperature approximately equal to the glass transition temperature of the melt composition (about 250 degrees C).

In operation, the apparatus 10 was used to dip the bait rod vertically into the melt to a depth of about 1 mm. The speed with which the bait rod was driven into, and then out of, the melt was about 25 cm/sec, to produce a residence time of the bait rod in the melt of about 0.1 sec. After each dip, the bait rod was held outside the melt for about 15 seconds, to permit the bait rod tip to be annealed, as described above.

The bait rod was dipped into the melt 200 times. Each such dip produced an increase in bait rod length equal to about 0.5 mm. Thus, after 200 dips, the length of the bait rod was increased by about 10 cm.

The newly-formed glass was viewed under an optical microscope and found to be clear, i.e., essentially free of crystallites.

What is claimed is:

1. A method for fabricating a device, comprising the steps of:

forming a melt having a composition which includes three or more metal halides;

converting at least a part of said melt into a solid glass body having at least one cross-sectional dimension greater than or equal to about 1 centimeter; and completing the fabrication of said device, said completing step including the step of incorporating at least a portion of the material of said glass body into said device, Characterized In That said converting step includes the step of cooling essentially every portion of said part at a rate which is both greater than about 10 Kelvins per second and chosen to substantially preclude the formation of crystallites in said glass body.

2. The method of claim 1 wherein essentially every portion of said part is cooled at a rate greater than or equal to about 30 Kelvins per second.

3. The method of claim 1 wherein essentially every portion of said part is cooled at a rate greater than or equal to about 70 Kelvins per second.

4. The method of claim 1 wherein said cooling step includes the step of dipping a substrate into, and then withdrawing said substrate from, said melt, thereby adhering a layer of melt material to said substrate.

5. The method of claim 1 wherein said cooling step includes the step of forming droplets of melt material, and impinging said droplets upon a substrate, thereby adhering a layer of melt material to said substrate.

6. The method of claim 1 wherein said device includes an optical fiber preform.

7. The method of claim 1 wherein said device includes an optical fiber.

* * * * *